Figure 1:
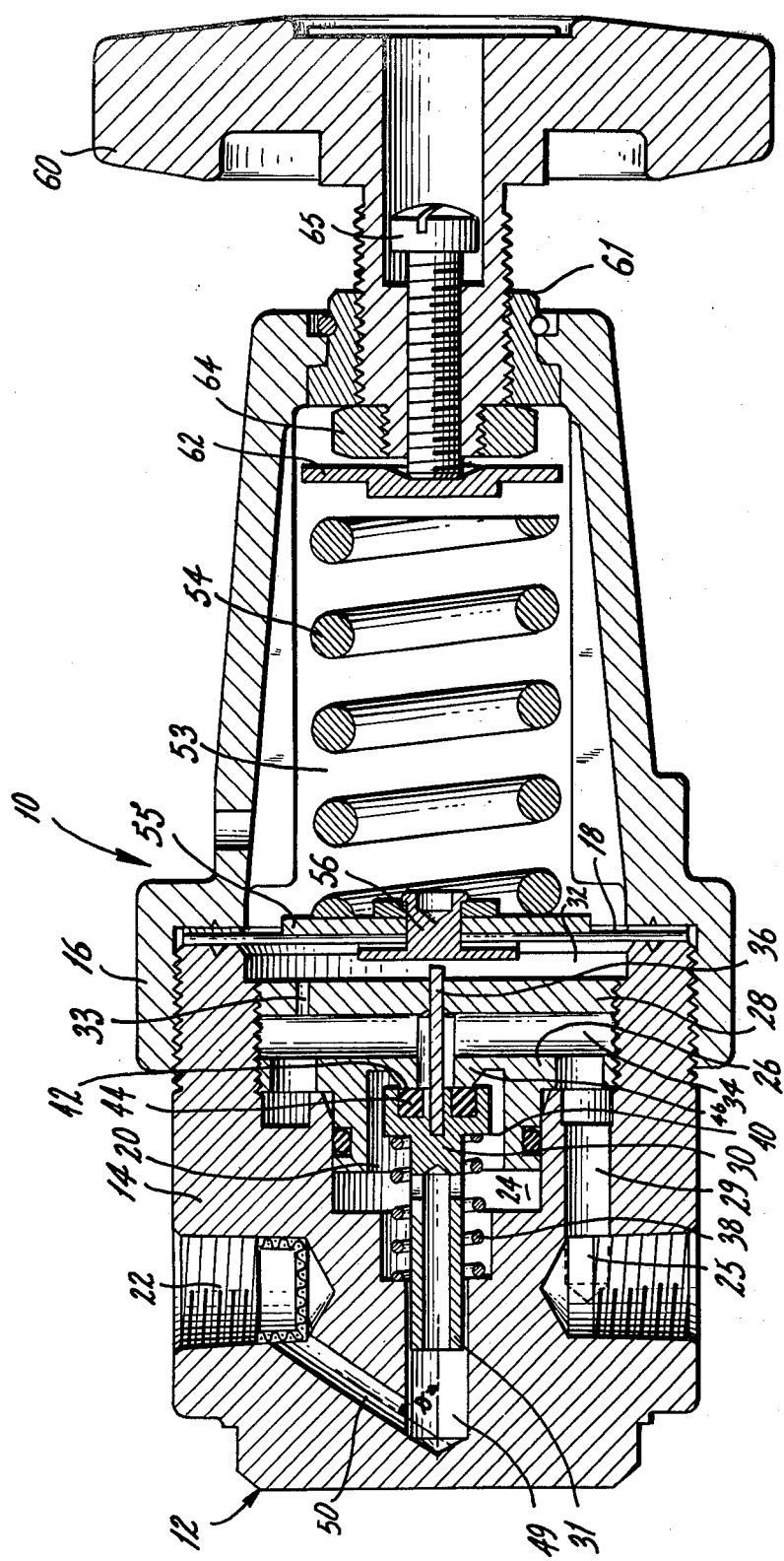

United States Patent [19]

Acomb

[11] 4,450,858
[45] May 29, 1984

[54] GAS PRESSURE REDUCING REGULATOR

[75] Inventor: Byron H. Acomb, Florence, S.C.

[73] Assignee: Union Carbide Corporation, Danbury, Conn.

[21] Appl. No.: 386,999

[22] Filed: Jun. 10, 1982

Related U.S. Application Data

[63] Continuation of Ser. No. 147,860, May 8, 1980, abandoned.

[51] Int. Cl.³ ............................................. F16K 31/12
[52] U.S. Cl. ............................. 137/505.37; 137/484.8; 137/505.12; 137/505.42
[58] Field of Search ...................... 137/505.12, 505.26, 137/505.36, 505.37, 505.42

[56] References Cited

U.S. PATENT DOCUMENTS

| | | | |
|---|---|---|---|
| 1,410,070 | 3/1922 | Mueller | 137/505.37 |
| 2,342,659 | 2/1944 | Grove | 137/505.42 X |
| 2,662,348 | 12/1953 | Jacobsson | 137/505.12 |
| 2,664,674 | 1/1954 | Niesemann | 137/505.37 X |
| 2,684,838 | 7/1954 | Rush | 137/505.37 X |
| 2,685,300 | 8/1954 | Hammon | 137/505.12 X |
| 2,854,991 | 10/1958 | Webster | 137/505.42 |

Primary Examiner—Harold W. Weakley
Attorney, Agent, or Firm—Eugene Lieberstein

[57] ABSTRACT

A gas pressure reducing regulator having a valve assembly with a slidable valve member containing a valve seat disposed within a valve chamber communicating with the inlet opening connection to a source of high inlet pressure through serially connected passageways having intersecting axes with an included angle of less than ninety degrees. The valve assembly also has a frustoconical tapered head juxtaposed relative to the valve seat such that upon loss of valve seat material the nozzle nestles into the seat to close off the valve.

2 Claims, 2 Drawing Figures

GAS PRESSURE REDUCING REGULATOR

This application is a continuation of our prior U.S. application Ser. No. 147,860 filed May 8, 1980 now abandoned.

This invention relates to gas pressure reducing regulators and more particularly to a single and two stage regulator for use with oxygen, acetylene and other industrial gases.

Fluid pressure reducing regulators for converting an inlet gas such as oxygen supplied from an external variable pressure source at relatively high pressure to a constant relatively low delivery pressure have been in commercial use for substantial number of years. On irregular occasions throughout each year reports of pressure regulator oxygen burnout are received. When oxygen burnout does occur the damage is invariably so extensive that the potential for serious operator injury from break through the regulator housing is very high and represents an operational hazard. Conditions contributing to a burnout are believed to be due to an accelerated rise in temperature attributable to adiabatic compression followed by ignition of the valve seat and other downstream elements such as the diaphragm.

The one and two stage regulator design of the present invention incorporate common features which minimize the probability of a burnout independent of the operating conditions of the regulator. In addition, some of these features minimize manufacturing cost and provide maintenance advantages over prior art designs.

In general, the pressure regulator design of the present invention includes a valve assembly having a slidable valve member containing a valve seat disposed within a valve chamber communicating with the source of high inlet pressure through a minimum of two serially connected conduits having intersecting axes with an included angle of less than 90 degrees and with the axis of one of the conduits being concentric with the longitudinal axis of the valve member. Accordingly the inrushing gas from the high pressure source must follow a tortuous path having at least one sharp turn of more than 90 degrees before entering the valve chamber and contacting the valve seat. It is postulated that a regulator having such an incoming gas travel path will not experience a degree of temperature rise at the valve seat necessary to cause oxygen ignition through adiabatic compression.

The pressure regulator of the present invention further includes a regulator valve having a nozzle with a frustoconical tapered head juxtaposed relative to a valve seat such that upon loss of any valve seat material the nozzle nestles into the seat to close off the valve. A further feature resides in the construction of the nozzle with one end thereof defining a baffle for substantially isolating the diaphragm chamber from the valve chamber.

The preferred two stage pressure regulator of the present invention includes two regulator valve assemblies with the first regulator valve assembly having a slidable piston containing a first valve seat disposed within a first valve chamber communicating with a source of high inlet pressure through a minimum of two serially connected passageways having intersecting axes with an included angle of less than (90) ninety degrees and wherein the second regulator valve assembly comprises a valve member slidable within the piston of said first regulator valve assembly, a valve seat and a nozzle having a head with a frustoconical extension aligned relative to the valve seat and valve stem extending through the head of the nozzle for engaging diaphragm.

Figure 2:
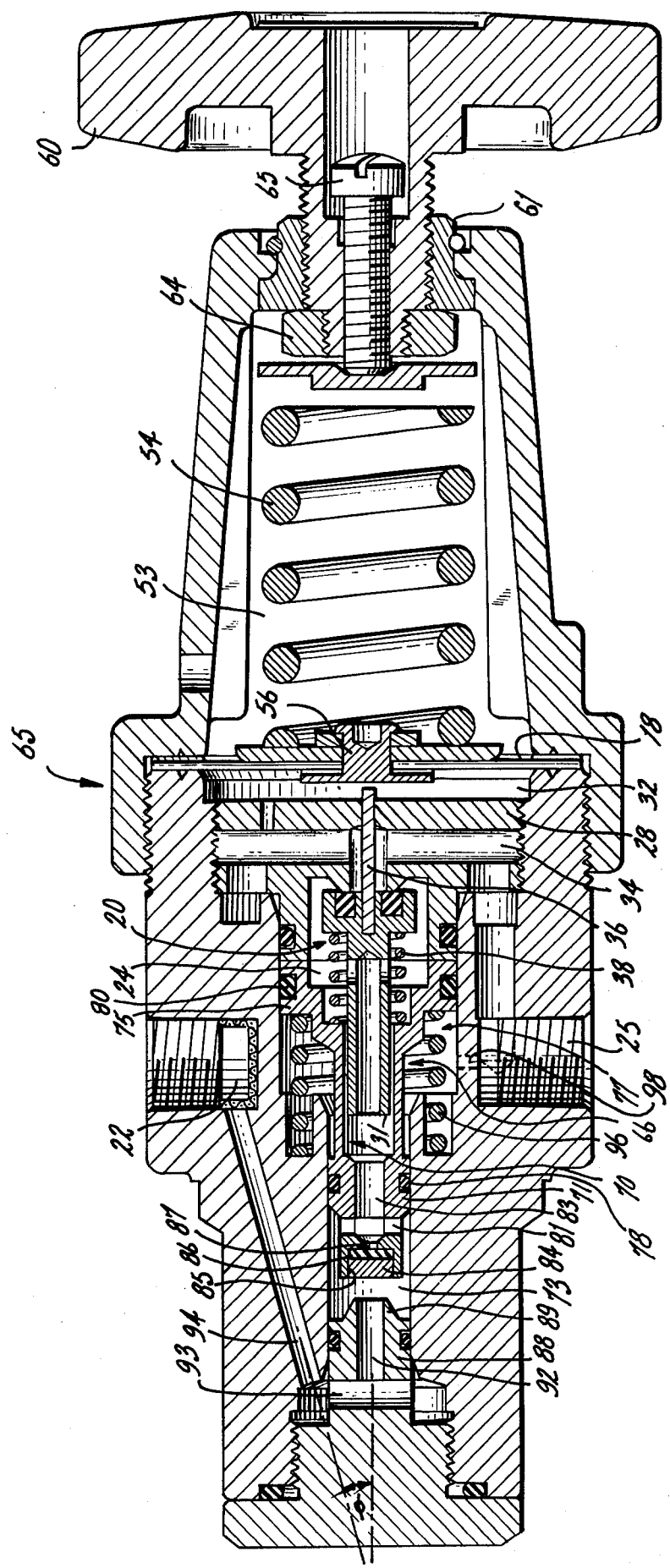

Other features and advantages of the pressure regulator of the present invention will become apparent from the following detailed description when read in conjunction with the accompany figures of which:

FIGS. 1 is a sectional view in side elevation of the preferred single stage embodiment of the gas regulator of the present invention; and FIG. 2 is a sectional view in side elevation of the preferred two stage embodiment of the gas regulator of the present invention.

Referring now in particular to FIG. 1, the single stage pressure regulator 10 of the present invention has a hollow body 12 with a thick outer casing wall 14 threadably fitted into a bonnet 16. A flexible diaphragm 18 is securely clamped between the casing wall 14 and the bonnet 16. A regulator valve generally depicted as 20 is mounted within the body 12 of the regulator 10. The body 12 has an inlet 22 for supplying gas at high pressure from a source (not shown) to a valve chamber 24 and an outlet 25 for supplying regulated gas at low pressure.

The regulator valve 20 comprises a nozzle 26 having a head 28 threadably engaged to the wall 14 of body 12 and a slidable valve member 30 disposed within the valve chamber 24. The head of 28 of the nozzle 26 is spaced from the diaphragm 18 to form a diaphragm chamber 32. A low pressure control chamber 34 is formed in the nozzle head 28 which communicates with the diaphragm chamber 32 through a bleeder hole 33. The low pressure control chamber 34 also communicates with the outlet connection 25 through a passage 29.

The valve member 30 has a cylindrical body 31 slidably mounted within a bore 49 of the casing wall 14 and has a valve stem 36 slidably mounted within a bore in the nozzle head 28. A compression spring 38 surrounds the body 31 and bears against a shoulder 40 extending from the body 31 in abutting relation with the extended portion 46 of nozzle 26. The shoulder 40 has a cylinderical recess 42 in which a valve seat 44 is molded. The valve seat 44 is composed of an elastomer material having a high resistance to combustion. The valve seat 44 is biased by the spring 38 against the extended portion 46 of the nozzle 26 for keeping the regulator valve 20 normally closed. The extended portion 46 has a frustoconical geometry with its tapered side in alignment with the edge of the recess 42 such that upon loss of valve seat material the tapered side nestles into the recess 42 to seal off the regulator valve 20.

The gas inlet 22 is connected to the valve chamber 24 through two inlet passageways 50 and 49 respectively. The longitudinal axes of the inlet passageways 50 and 49 intersect to form an included angle $\theta$ of less than ninety (90) degrees. Although more than two passageways may be used at least two are essential to the present invention to assume a path which requires the inlet gas to make at least one sharp turn of more than ninety (90) degrees before entering the valve chamber 24 and contacting the valve seat 44.

The bonnet 16 defines a bonnet chamber 53 which includes a loading spring 54. One end of the loading spring 54 abuts a pressure plate 55 to which the diaphragm 18 is attached by a rivet 56 while the opposite end is connected to a support plate 62. A pressure adjusting screw 60 is threaded through a bushing 61 in engagement against the support plate 62 which, in turn, pushes against the loading spring 54. A lock nut 64 prevents the adjusting screw 60 from being removed from the bonnet chamber 53. A trim screw 65 is threadably connected to the pressure adjusting screw and contacts the support plate 62 to provide a vernier adjustment after the pressure adjusting screw 60 is rotated full in to establish the desired maximum delivery pressure. The spring 54 applies a downward pressure upon the plate 55 to move the diaphragm assembly into contact with the valve stem 36. When this pressure is sufficient to overcome the forces acting on the shoulder 40 of the valve member 30, the valve member 30 is slidably adjusted along the longitudinal axis of the regulator into an open valve position to admit gas into the low pressure control chamber 34 and in turn into the diaphragm chamber 32. The diaphragm assembly stabilizes the forces on the valve stem 36 tending to maintain equilibrium. The separation of the diaphragm chamber 32 from the low pressure chamber 34 by means of the nozzle head 28 provides a damping action in the operation of the regulator and tends to isolate the diaphragm 18 from direct contact with inrushing gas through the valve 20 which also minimizes the potential of oxygen burnout.

The embodiment of FIG. 2 depicts a two stage pressure regulator 65 using the regulator valve 20 of FIG. 1 for the second stage of regulation. The first stage of gas regulation is controlled by a regulator valve generally designated by the reference character 66. Elements in the regulator embodiment of FIG. 1 which correspond to corresponding elements in the regulator embodiment of FIG. 2 have the same reference character designation.

The regulator valve 66 comprises a piston 70 of generally cylindrical geometry with a front section 71 slidably movable within the valve chamber 73 and a rear section 75 slidably movable within the spring chamber 77. The valve chamber 73 is sealed from the spring chamber 77 by an "0" ring 78 while the spring chamber 77 is sealed from the valve chamber 24 by an "0" ring 80. The front section 71 has a cross drilled passage 81 communicating with a central passage 83 extending the full length of piston 70. A substantially disk-like valve seat 84 is mounted in a cylindrical recess 85 which is formed in the front section 71 open to the valve chamber 73. The valve seat 84 is mounted over a noncombustible back up disk 86 which is dropped into the recess 85 before inserting the valve seat 84. The recess 85 is connected to the central passage 83 through a opening 87 for readily providing access to the valve seat 84 when its replacement becomes necessary.

A valve nozzle 88 is mounted in the valve chamber 73 adjacent the valve seat 84. The nozzle 88 has a frustoconical tapered head 89 in alignment with the edge of the recess 85 to close off the valve chamber 73 upon loss of valve seat material 84. The valve seat 84 should be of a plastic material selected for its noncumbustible properties.

The valve nozzle 88 has a central bore 92 which communicates with the gas inlet opeining 22 through cross drilled passageway 93 and through the inlet passageway 94 in the casing wall of the regulator body. The two passageways 92 and 94 have longitudinal axes (shown in dotted lines) which intersect to form an included angle $\phi$ of less than ninety degrees. This causes the gas fed through the inlet opening 22 to make a turn of greater than ninety degrees before entering the valve chamber 73 and contacting the valve seat 84.

The piston 70 is concentric with the longitudinal axis of the regulator 65 and the slidable valve member 31 of the regulator valve 20. A spring 96 surrounds an intermediate portion of the piston 70 and operates to hold valve chamber 73 open until the chamber pressure 24 over the head of the piston 70 forces the piston 70 downwards so as to throttle off chamber 73 in order to maintain a desired first stage delivery pressure at chamber 24. The spring 96 provides a static force which is dynamically supplemented by delivery gas pressure through feedback passage 98 interconnecting the spring chamber 77 and the low pres delivery side at the gas outlet 25.

The piston 70 of the first stage regulator valve 66 is slidably adjusted to establish an intermediate gas pressure in the second stage valve chamber 24 for any given combination of manual adjustments in the pressure adjusting screw 60 and trim screw 65. The pressure adjusting screw 60 provides the operator with control over the setting of the gas outlet pressure as explained earlier in conjunction with the single stage regulator 10. The feedback passage from the delivery side at the gas outlet to the spring chamber of the first regulator stage provides a constant pressure differential between chamber 73 and chamber 24 and permits a large drop in gas pressure at the inlet end of the pressure regulator without loss in gas regulation.

What is claimed is:

1. A single stage pressure regulator resistant to oxygen burnout for regulating the flow of oxygen supplied to the regulator from a source of oxygen at a high inlet gas pressure comprising: a hollow regulator body having an inlet opening adapted to be connected to said source of oxygen; an outlet opening for discharging said oxygen at a controlled reduced pressure; a valve chamber having an upstream and downstream end relative to the flow of said oxygen; a control chamber; a valve disposed within said valve chamber and including a slidable valve member containing a valve seat of elastomer material with a high resistance to combustion disposed at the downstream end of said valve chamber and a valve stem; spring means surrounding said slidable valve member at a location separated from the inlet gas flow path for urging said valve into a closed position; a nozzle assembly having a nozzle head for separating said valve chamber from said control chamber, said nozzle head having a frustoconical tapered extension juxtaposed relative to the valve seat for sealing off the valve upon loss of valve seat material; a bonnet having a bonnet chamber; diaphragm means for separating said bonnet chamber from said valve chamber and for forming a diaphragm chamber, with said diaphragm means including a flexible diaphragm and with said valve stem extending through said nozzle head into said diaphragm chamber in biased engagement with said diaphragm, a bleeder hole located in said nozzle head for controllably restricting the flow of gas from said control chamber to said diaphragm chamber so as to isolate the diaphragm from direct contact with inrushing gas through said valve; and first and second conduit means communicating with the valve chamber at the upstream end thereof, said first and second conduit means having axes which intersect to form an included angle of less than ninety degrees with one of said conduit means being concentric with the longitudinal axis of said valve assembly.

2. A single stage pressure regulator as defined in claim 1 wherein the volumn occupied by said valve chamber is substantially greater than the volumn occupied by said conduit means.

* * * * *